(12) United States Patent
Liu

(10) Patent No.: US 10,322,739 B2
(45) Date of Patent: Jun. 18, 2019

(54) BABY CARRIAGE AND CARRIAGE FRAME THEREOF

(71) Applicant: SUNNYLOVE BABY PRODUCTS ZHUHAI CO., LTD, Zhuhai, Guangdong Province (CN)

(72) Inventor: Xiu-Ping Liu, Zhuhai (CN)

(73) Assignee: SUNNYLOVE BABY PRODUCTS ZHUHAI CO., LTD., Zhuhai (CN)

(*) Notice: Subject to any disclaimer, the term of this patent is extended or adjusted under 35 U.S.C. 154(b) by 12 days.

(21) Appl. No.: 15/867,038

(22) Filed: Jan. 10, 2018

(65) Prior Publication Data

US 2018/0201291 A1 Jul. 19, 2018

(30) Foreign Application Priority Data

Jan. 16, 2017 (CN) .......................... 2017 1 0028448

(51) Int. Cl.
*B62B 7/08* (2006.01)
*B62B 7/00* (2006.01)
*B62B 7/14* (2006.01)
*B62B 7/06* (2006.01)

(52) U.S. Cl.
CPC .............. *B62B 7/006* (2013.01); *B62B 7/008* (2013.01); *B62B 7/06* (2013.01); *B62B 7/142* (2013.01)

(58) Field of Classification Search
CPC ......... B62B 7/006; B62B 7/008; B62B 7/142; B62B 7/06; B62B 7/00; B62B 7/04; B62B 7/08; B62B 7/064; B62B 7/066; B62B 9/28; B62B 9/102
See application file for complete search history.

(56) References Cited

U.S. PATENT DOCUMENTS

| 5,472,224 | A | * | 12/1995 | Cabagnero | ................ B62B 7/08 280/42 |
| 5,752,738 | A | * | 5/1998 | Onishi | ................ B62B 7/08 280/642 |
| 6,086,086 | A | * | 7/2000 | Hanson | ................ A61G 5/00 280/642 |
| 6,581,957 | B1 | * | 6/2003 | Lan | ................ B62B 9/104 280/47.38 |
| 8,313,115 | B2 | * | 11/2012 | Cheng | ................ B62B 7/142 280/47.38 |
| 8,602,442 | B2 | * | 12/2013 | Li | ................ B62B 7/062 280/642 |

(Continued)

*Primary Examiner* — James M Dolak
(74) *Attorney, Agent, or Firm* — Rabin & Berdo, P.C.

(57) ABSTRACT

A baby carriage frame has a frame body, a front-seat panel, a rear-seat panel, and two rear-seat fixing assemblies. The two seat panels are mounted on the frame body, and the rear-seat panel is front-and-rear moveable. Two clamping recesses in a bottom of the rear-seat panel are downwardly disposed around the frame body. Each rear-seat fixing assembly has a seat pivot frame and a seat clamping panel pivotally connected to each other, and the seat clamping panel has a seat eccentric part to abut tightly against a transverse side of the rear-seat panel to fix the rear-seat panel on the frame body, which is convenient and quick in use. The clamping recesses on a bottom of the rear-seat panel enable the rear-seat panel to move continuously front-and-rear along the frame body in one step, thereby adjusting the space between the two seat panels to be adapted to various situations.

19 Claims, 18 Drawing Sheets

(56) References Cited

U.S. PATENT DOCUMENTS

| | | | | |
|---|---|---|---|---|
| 8,870,215 B2* | 10/2014 | Li | ............................ | B62B 9/00 |
| | | | | 280/647 |
| 8,979,114 B2* | 3/2015 | Cheng | ..................... | B62B 7/062 |
| | | | | 280/642 |
| 9,346,479 B1* | 5/2016 | Ransil | ..................... | B62B 7/064 |
| 9,616,912 B2* | 4/2017 | Haut | ....................... | B62B 7/008 |
| 9,855,964 B2* | 1/2018 | Sack | ........................ | B62B 7/10 |
| 10,023,217 B2* | 7/2018 | Sack | ....................... | B62B 7/062 |

* cited by examiner

BABY CARRIAGE AND CARRIAGE FRAME THEREOF

CROSS-REFERENCE TO RELATED APPLICATIONS

This application is based upon and claims priority under 35 U.S.C. 119 from China Patent Application No. 201710028448.8 filed on Jan. 16, 2017, which is hereby specifically incorporated herein by this reference thereto.

BACKGROUND OF THE INVENTION

1. Field of the Invention

The present invention relates to a baby carriage.

2. Description of the Prior Arts

The baby carriage is a fairly common tool for families with babies or children today, which prevents the parents from holding the baby all the time and keeps their hands or shoulders free while moving. A conventional baby carriage with double seats is also developed for accommodating two babies.

However, the two seats of the aforementioned baby carriage are fixed and unmovable. Thus, as the baby grows, the spaces of the baby carriage may be insufficient for the baby or the child.

In addition, for families having babies or children, the baby car basket or the child car safety seat are also common tools. But when the baby car basket or the child car safety seat is put on one of the two seats of the baby carriage, the baby car basket or the child car safety seat may extend to the other seat due to the large volume, and thus none of the two seats can accommodate the baby or the child, which is inconvenient.

As a result, the fixed and unmovable seats of the conventional baby carriage cause inconvenience in use, and need to be improved.

It is to be understood that the disclosure of the information in this background is only intended to increase the understanding of the overall background of the present invention and should not be regarded as admitting or in any way hinting that the information constitutes a prior art that is known to those skilled in the art.

To overcome the shortcomings, the present invention provides a baby carriage and a carriage frame thereof to mitigate or obviate the aforementioned problems.

SUMMARY OF THE INVENTION

The main objective of the present invention is to provide a baby carriage and a carriage frame thereof that can improve the ride experience for the baby or the child, and improve the adaptability to various situations and reliability.

The carriage frame has a frame body, multiple wheels, a front-seat panel, a rear-seat panel, and at least one rear-seat fixing assembly. The wheels are mounted on the frame body. The front-seat panel is mounted on the frame body. The rear-seat panel is front-and-rear moveably mounted on the frame body, is disposed in back of the front-seat panel, and has at least one clamping recess. The at least one clamping recess is formed in a bottom of the rear-seat panel, is disposed adjacent to one of two transverse sides of the rear-seat panel, and is downwardly disposed around the frame body. The at least one rear-seat fixing assembly corresponds to the at least one clamping recess. Each one of the at least one rear-seat fixing assembly has a seat pivot frame and a seat clamping panel. One of two sides of the seat pivot frame is pivotally connected to the bottom of the rear-seat panel and is disposed adjacent to the corresponding clamping recess. The seat pivot frame is rotatable to be disposed below the corresponding clamping recess. The seat clamping panel is pivotally connected to the other side of the seat pivot frame, and has a seat eccentric part. The seat eccentric part selectively abuts tightly against the transverse side that the corresponding clamping recess is disposed adjacent to, so as to fix the rear-seat panel on the frame body.

As mentioned above, the rear-seat fixing assembly has a seat pivot frame and a seat clamping panel, and the seat clamping panel is mounted with a seat eccentric part. The relative rotation between the seat eccentric part and the seat pivot frame makes the seat eccentric part tightly abut the rear-seat panel to fix the rear-seat panel on the frame body, which is convenient and quick in use, is reliable, and is easy to separate the rear-seat panel from the frame body.

The clamping recess on a bottom of the rear-seat panel also enables the rear-seat panel to move continuously front-and-rear along the frame body in one step. When the rear-seat panel is moved to any suitable position, the rear-seat panel can be quickly and stably fixed on the frame body. When the baby or the child grows up, or when the baby car basket or the child safety seat is put on to be above the front-seat panel, the rear-seat panel can be moved backward to enlarge the space between the front-panel and the rear-seat panel, such that the baby or the child still can sit on the rear-seat panel. The present invention can be adapted to various situations and has various ways of use.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
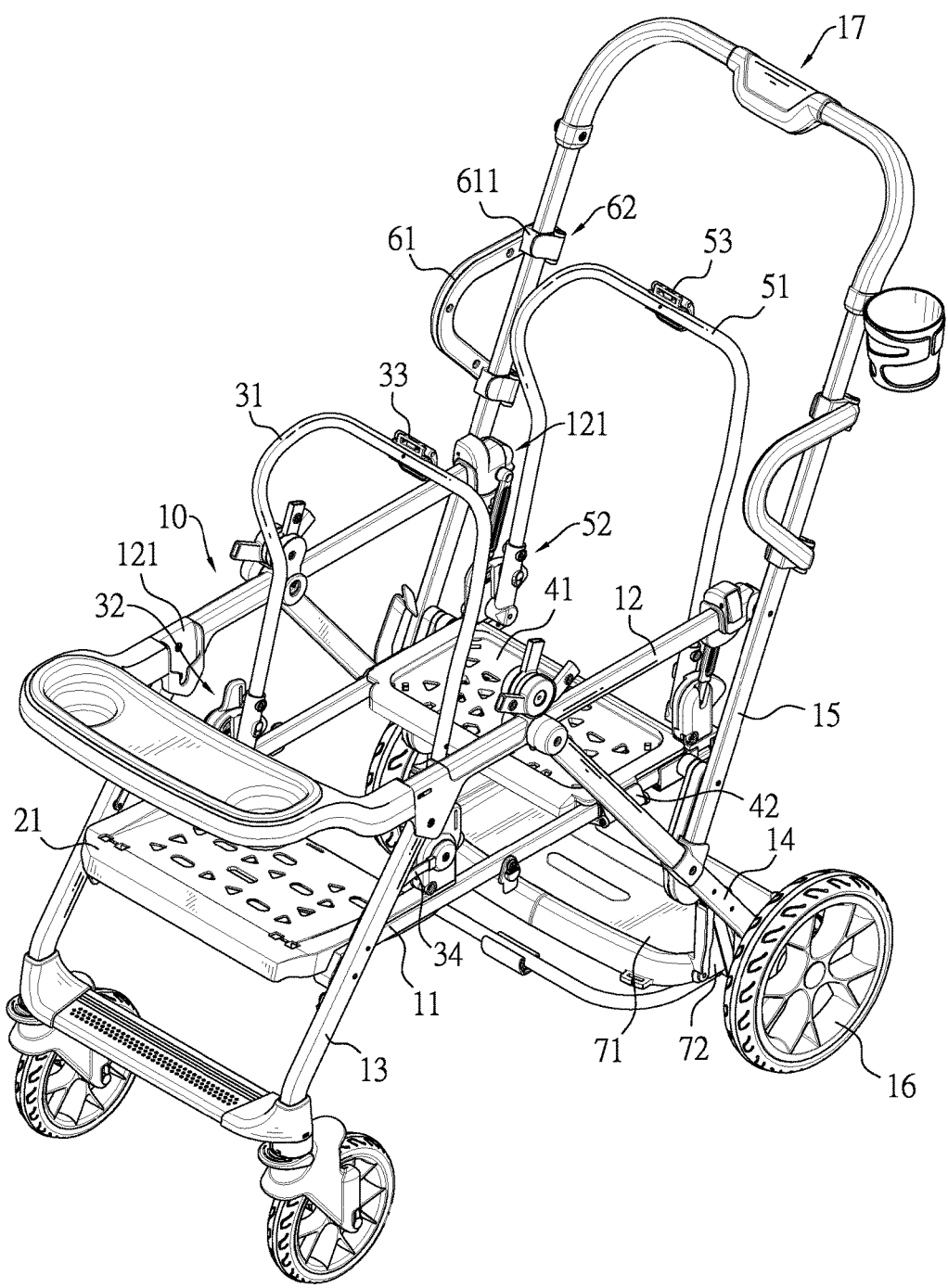
FIG. 1 is a perspective view of a baby carriage in accordance with the present invention.

The technical features in the embodiments will be described in detail below in connection with the drawings in the present invention. Obviously, the described embodiments are merely a partial embodiment of the present invention, and not all embodiments. All other embodiments obtained by ordinary skill in the art without making creative work are within the scope of the present invention, based on the following embodiments.

In the following description of this present invention, it is to be understood that the terms "middle", "transversely", "vertical", "front", "rear", "left", "right", "upper", "lower", "top", "bottom", "inner", "outer" and the like are based on the azimuth or positional relationship shown in the drawings. The description, rather than indicating or implying that the device or element referred to must have a specific orientation, is constructed and operated in a particular orientation and therefore cannot be construed as limiting the scope of the present invention.

Figure 2:
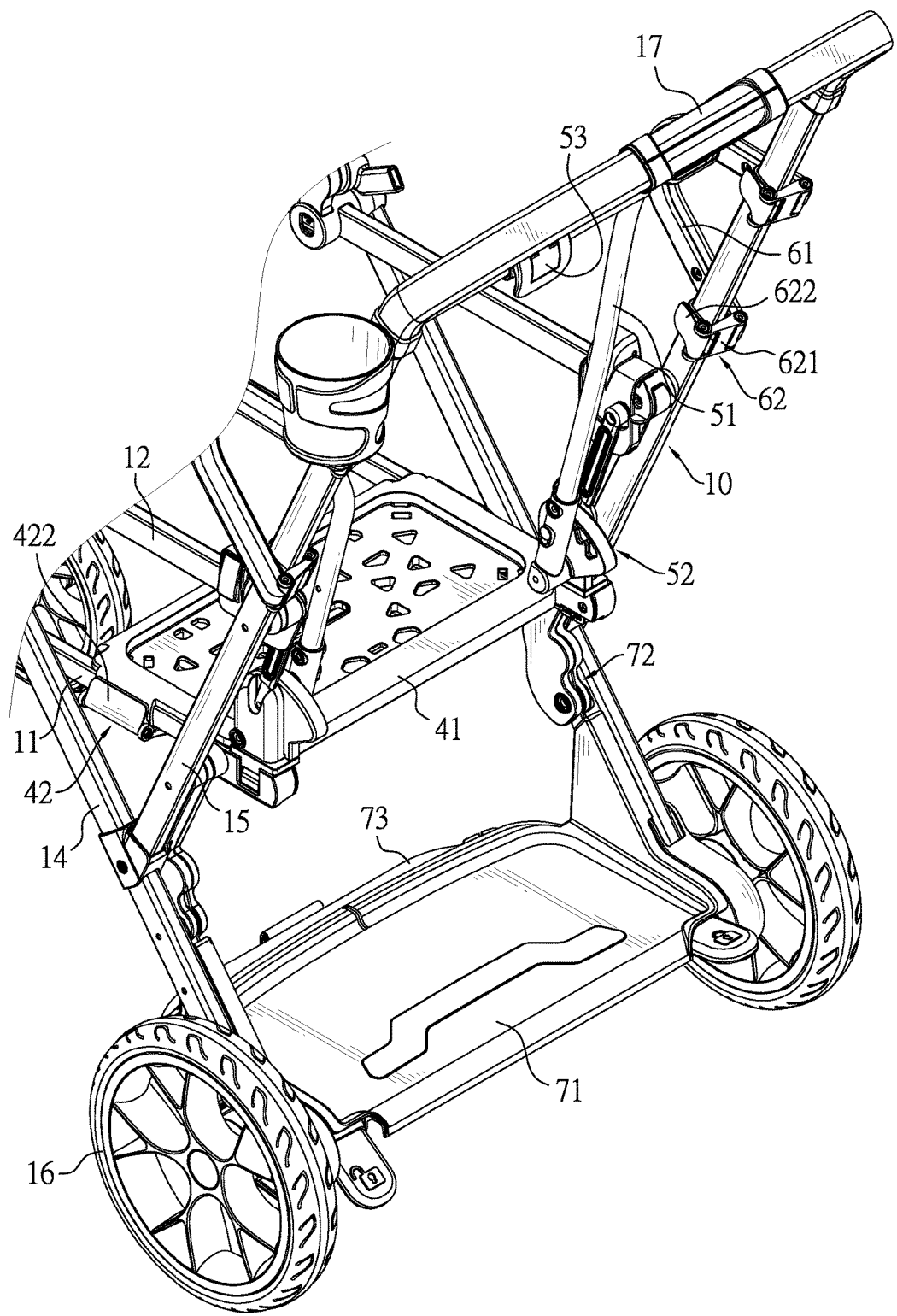
FIG. 2 is another perspective view of the baby carriage in FIG. 1.

With reference to FIGS. 1 and 2, a baby carriage in accordance with the present invention comprises a frame body 10, four wheels 16, a folding switch assembly 17, a stand board 71, two stand linking assemblies 72, a front-seat panel 21, a front back-support rod 31, two front back-support fixing assemblies 32, a front back-support switch assembly 33, a rear-seat panel 41, two rear-seat fixing assemblies 42, a rear back-support rod 51, two rear back-support fixing assemblies 52, a rear back-support switch assembly 53, two armrests 61, and two armrest fixing assemblies 62.

Figure 13:
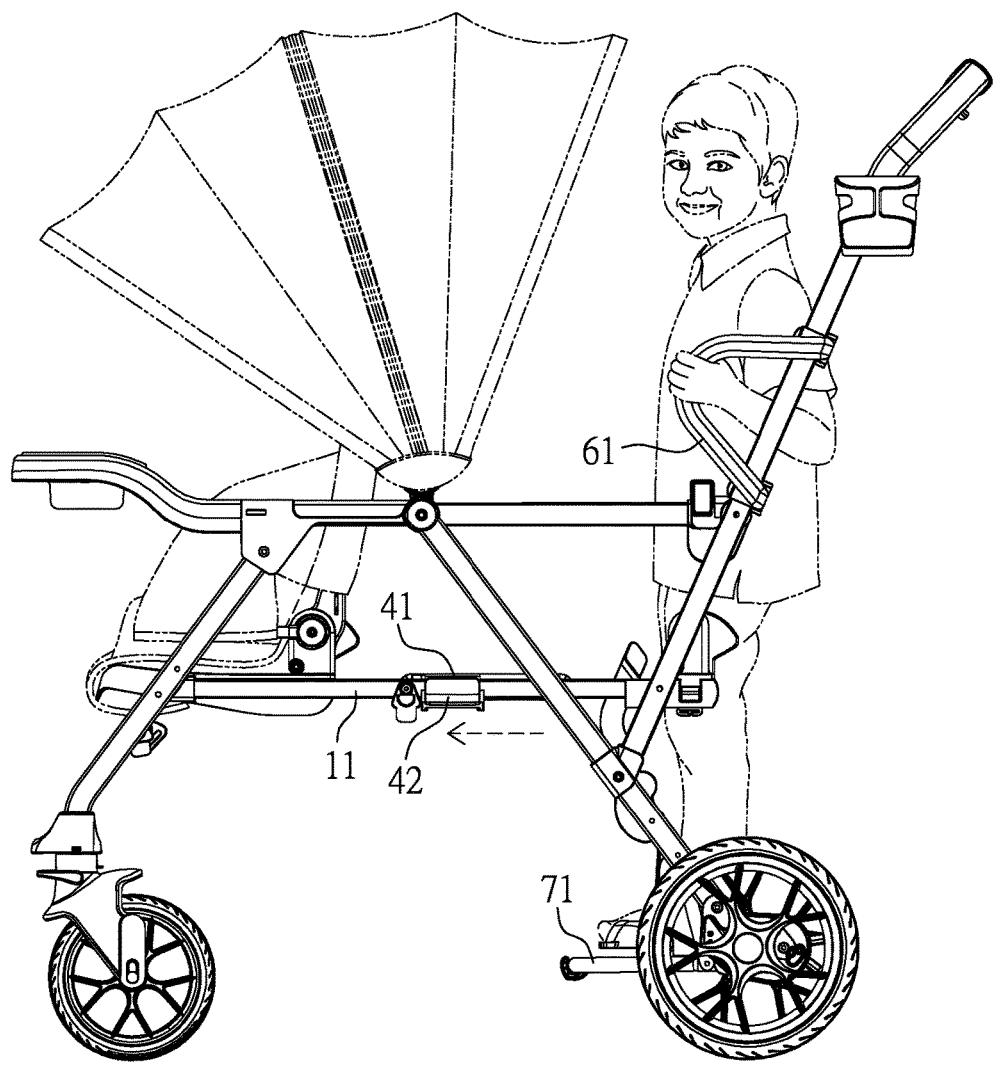
FIGS. 13 and 14 are side views of the baby carriage in FIG. 1, showing the rear-seat panel moved frontward and a rear back-support rod detached.

With reference to FIGS. 1, 2, and 13, the frame body 10 has two seat rods 11, two armrest rods 12, two front foot rods 13, two rear foot rods 14, and a pushing rod 15. The two seat rods 11 and two armrest rods 12 extend front-and-rear. The two seat rods 11 are transversely spaced apart from each other. The two armrest rods 12 are transversely spaced apart from each other, and respectively disposed above the two seat rods 11. Middle parts of the two front foot rods 13 are respectively connected to front ends of the two seat rods 11. Top ends of the two front foot rods 13 are respectively connected to front ends of the two armrest rods 12. Top ends of the two rear foot rods 14 are respectively connected to middle parts of the two armrest rods 12. In a preferred embodiment, the four wheels 16 are respectively mounted on bottom ends of the two front foot rods 13 and bottom ends of the two rear foot rods 14. But the wheels 16 are not limited by the aforementioned, may be three or other numbers in amount, and may be mounted in any other position.

The pushing rod 15 is U-shaped with a downward opening, and is connected to rear ends of the seat rods 11 and rear ends of the armrest rods 12. Two bottom ends of the pushing rod 15 are respectively connected to two middle parts of the two rear foot rods 14. In a preferred embodiment, the front foot rods 13 are pivotally connected to the two seat rods 11 and the two armrest rods 12. The pushing rod 15 is pivotally connected to rear ends of the two seat rods 11, and is pivotally connected to rear ends of the two armrest rods 12. Two top ends of the rear foot rods 14 are respectively pivotally connected to the two armrest rods 12. Thus, the seat rods 11, the armrest rods 12, the front foot rods 13, and the pushing rod 15 form a four-bar linkage to be folded, and the folding can be proceeded with the folding switch assembly 17.

Figure 3:
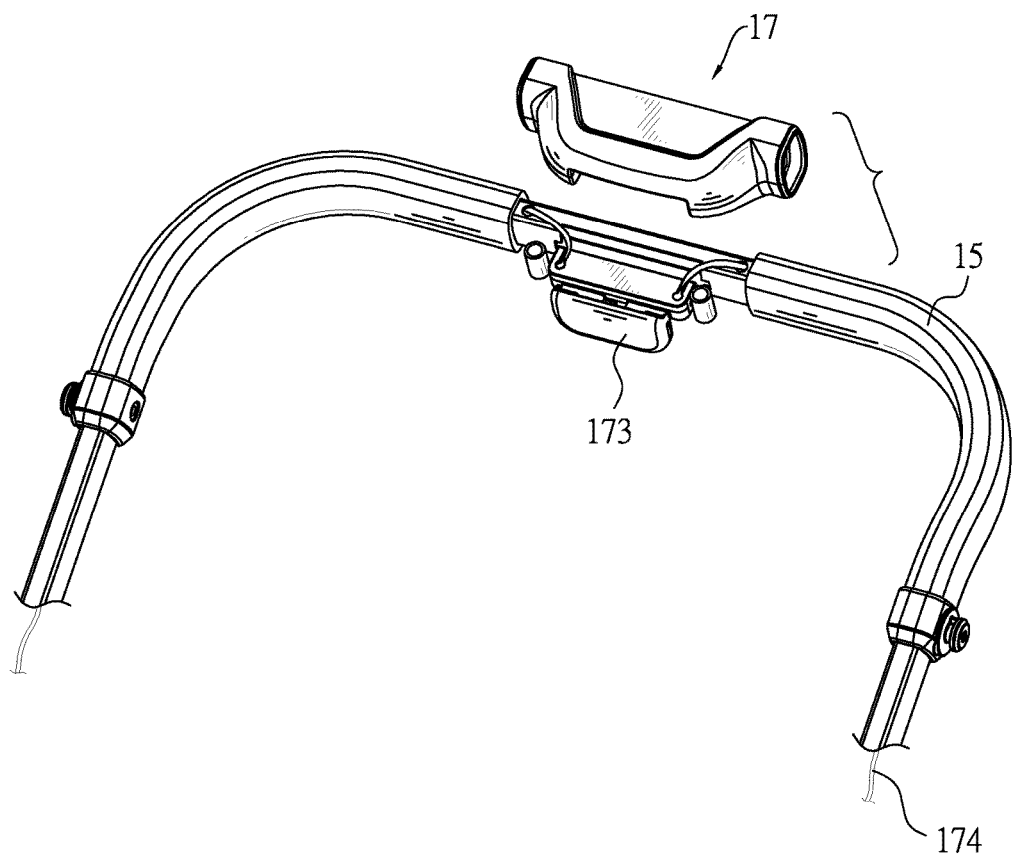
FIG. 3 is an exploded perspective view of a folding switch assembly of the baby carriage in FIG. 1.
Figure 4:
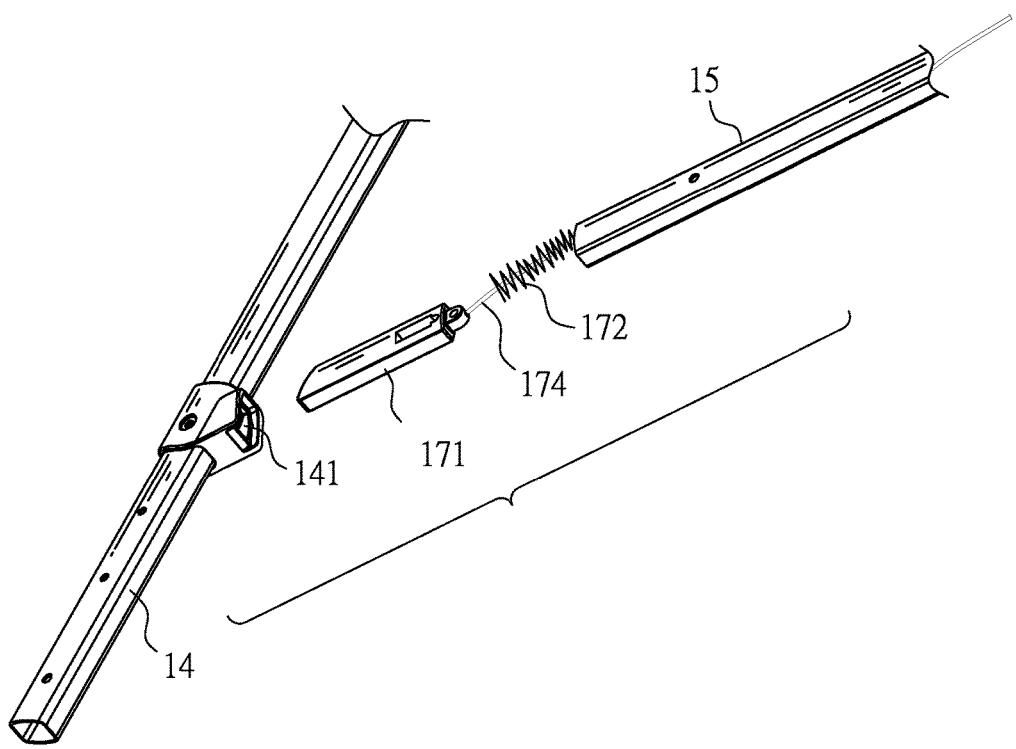
FIG. 4 is another exploded perspective view of the folding switch assembly of the baby carriage in FIG. 1.
Figure 5:
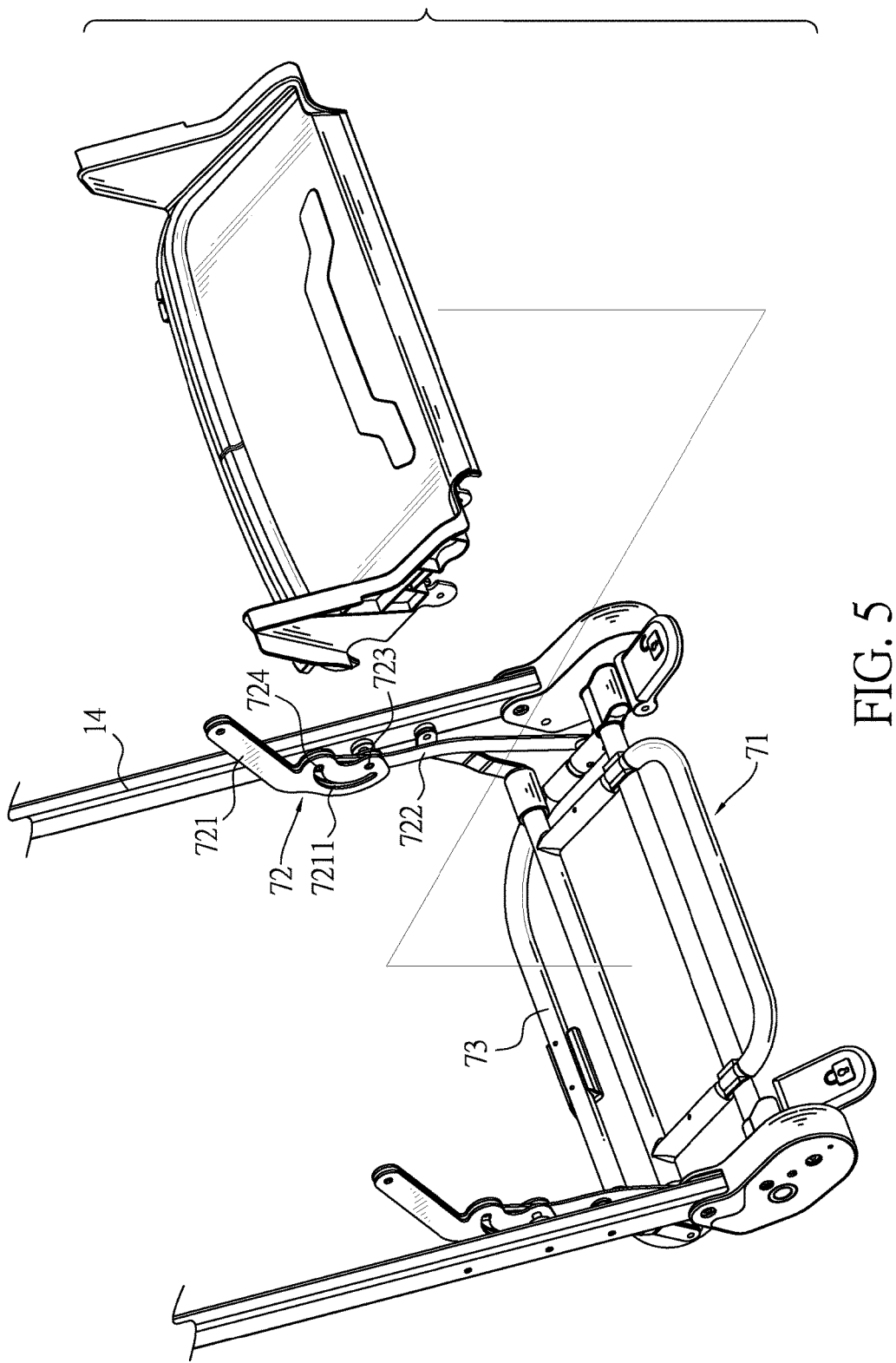
FIG. 5 is an exploded perspective view of a stand linking assembly of the baby carriage in FIG. 1.
Figure 6:
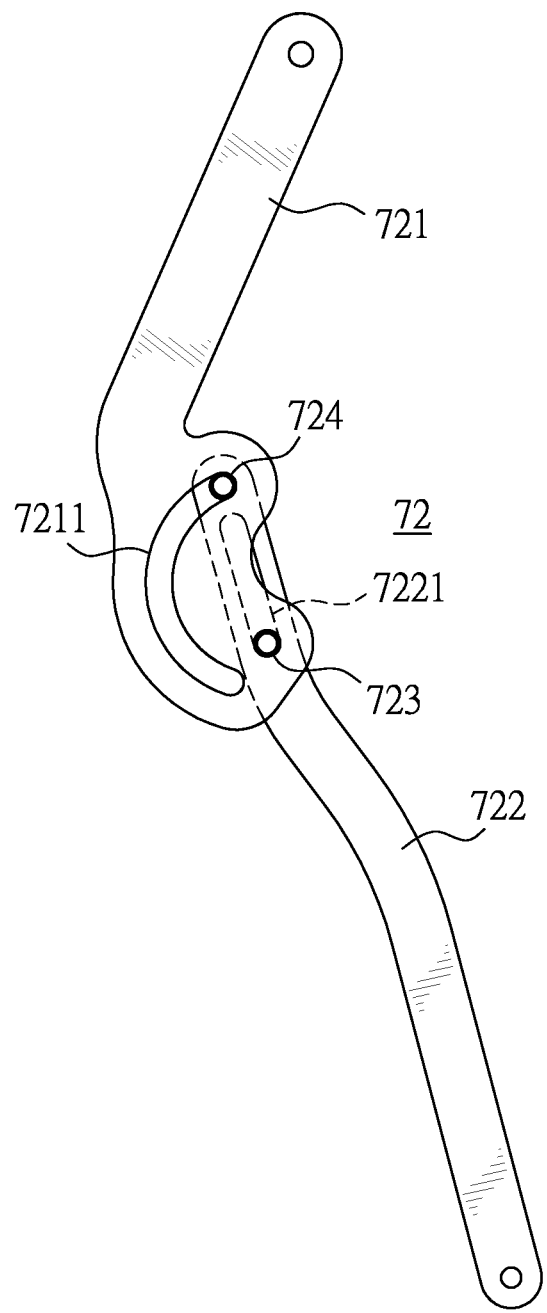
FIG. 6 is a side view of a driving element and a link rod of the stand linking assembly of the baby carriage in FIG. 1.

With reference to FIGS. 2 to 4, two receiving recesses 141 are respectively downwardly formed in the two middle parts of the two rear foot rods 14. The folding switch assembly 17 is mounted on a middle part of the pushing rod 15, and has two fixing units 171, two fixing unit resilient elements 172, a folding switch 173, and two folding ropes 174. The two fixing units 171 are up-and-down movably mounted in the pushing rod 15, and are selectively downwardly mounted in the two receiving recesses 141 of the two rear foot rods 14. The two fixing unit resilient elements 172 are mounted in the pushing rod 15, and respectively push the two fixing units 171 into the corresponding receiving recess 141. Two ends of each folding rope 174 are respectively connected to the folding switch 173 and one of the fixing units 171. In a preferred embodiment, the folding rope 174 is preferably, but not limited to, a steel rope. The folding switch 173 can pull up the two fixing units 171 via the two folding ropes 174.

Therefore, when the seat rods 11, the armrest rods 12, the front foot rods 13, and the pushing rod 15 are expanded for use, the two fixing units 171 on the pushing rod 15 are mounted in the receiving recesses 141 of the rear foot rods 14 to keep the frame body 10 in the expanded situation. To fold the frame body 10, the folding switch 173 is pressed to separate the fixing units 171 from the receiving recesses 141. At this time, the pushing rod 15 can be pushed forward to fold the frame body 10.

With reference to FIGS. 2, 5, 6, and 17, the stand board 71 is mounted between the two rear foot rods 14 and disposed between the two wheels 16 on the two rear foot rods 14. The two stand linking assemblies 72 are mounted on two sides of the stand board 71. Each stand linking assembly 72 is connected to the rear foot rod 14 and the seat rod 11 that are at the same side. When the frame body 10 is folded, the stand linking assemblies 72 rotate the stand board 71 to be folded. When the frame body 10 is expanded, the stand linking assemblies 72 also rotate the stand board 71 to be horizontally expanded.

In a preferred embodiment, each stand linking assembly 72 has a driving element 721 and a linking rod 722. A top end of the driving element 721 is pivotally connected to the rear end of the seat rod 11. A bottom end of the driving element 721 is pivotally connected to the rear foot rod 14 via a first pin 723. A curved guiding hole 7211 is formed through the driving element 721. A second pin 724 is mounted through the linking rod 722, and is mounted in the curved guiding hole 7211. A linking slide hole 7221 is formed through a top end of the linking rod 722, and is disposed below the second pin 724. The first pin 723, which is pivotally connected to the driving element 721 and the rear foot rod 14, is mounted through the linking slide hole 7221. A bottom end of the linking rod 722 is pivotally connected to the stand board 71.

As such, to fold the frame body 10, the pushing rod 15 is pushed forward to move back the seat rods 11. Then, the back movements of the seat rod 11 make the driving element 721 rotated backward, and the first pin 723 is the rotating axis. The driving element 721 downwardly pushes the linking rod 722 via the curved guiding hole 7211 and the second pin 724. Finally, the downward movement of the linking rod 722 makes the stand linking assembly 72 simultaneously rotate the stand board 71 to be vertical, thereby achieving the folding.

Figure 17:
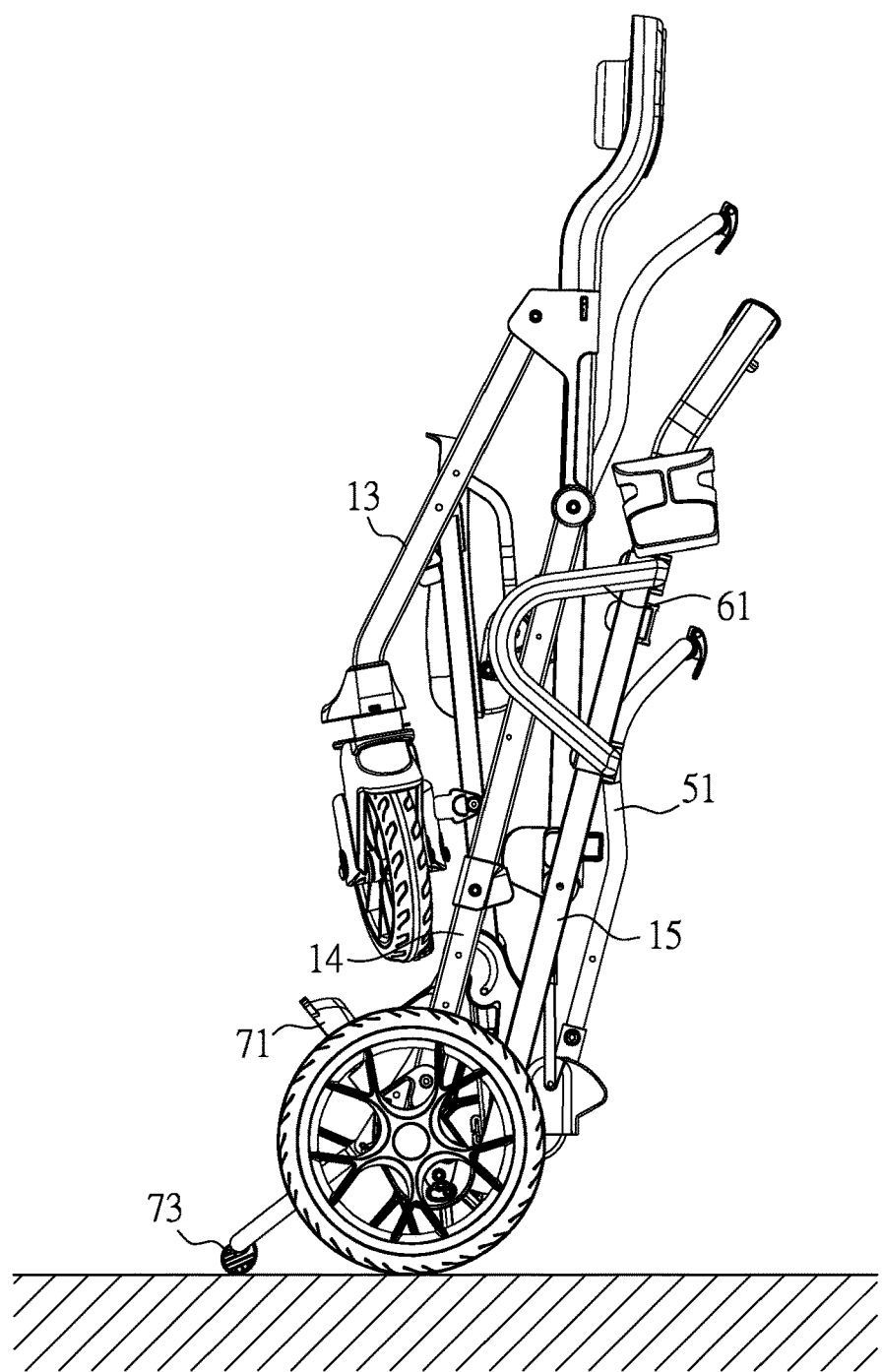
FIG. 17 is a side view of the baby carriage in FIG. 1, showing a baby carriage frame folded.

With reference to FIG. 17, in another preferred embodiment, the stand board 71 is further pivotally connected with a stand tube 73. When the frame body 10 is folded and the baby carriage frame is standing, the stand tube 73 is simultaneously rotated by the stand linking assemblies 72 and the stand board 71 to abut on the ground to keep the baby carriage frame in a standing position.

With reference to FIGS. 1, 2, 7, and 8, the front-seat panel 21 and the rear-seat panel 41 are mounted on the frame body 10, are mounted between the two seat rods 11, and are spaced apart from each other.

The rear-seat panel 41 is front-and-rear moveable relative to the frame body 10, thereby adjusting a distance between the front-seat panel 21 and the rear-seat panel 41 to adapt to the babies and the children of different body sizes.

Furthermore, the rear-seat panel 41 is detachable from the frame body 10, such that the frame body 10 may have larger space to accommodate various items when removing the rear-seat panel 41. The seat space of the present invention can be adjusted, and has multiple functions.

To be specific, a bottom of the rear-seat panel 41 is formed with two clamping recesses 411. The two clamping recesses 411 are respectively disposed adjacent to two transverse sides of the rear-seat panel 41, and are respectively downwardly disposed around the two seat rods 11 of the frame body 10.

The two rear-seat fixing assemblies 42 are respectively mounted on the transverse sides of the rear-seat panel 41, are connected to the frame body 10, and can fix the rear-seat panel 41 on the frame body 10. In a preferred embodiment, the two rear-seat fixing assemblies 42 are respectively correspond to the two clamping recesses 411. Each rear-seat fixing assembly 42 has a seat pivot frame 421 and a seat clamping panel 422. A side of the seat pivot frame 421 is pivotally connected to the bottom of the rear-seat panel 41. The seat pivot frame 421 is disposed adjacent to the corresponding clamping recess 411, and the seat pivot frame 421 is rotatable to be disposed below the corresponding clamping recess 411.

Figure 7:
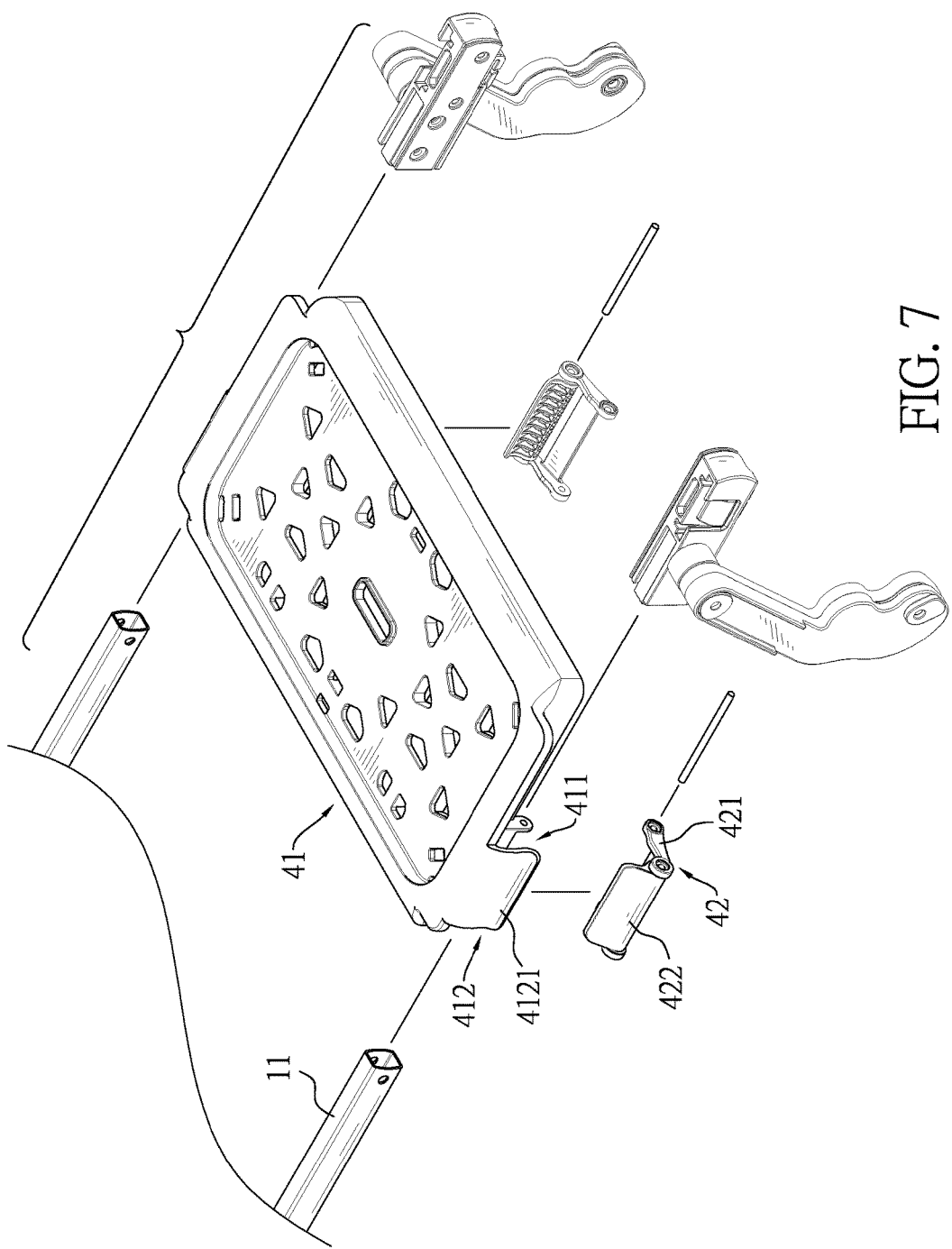
FIG. 7 is an exploded perspective view of a rear-seat fixing assembly of the baby carriage in FIG. 1.
Figure 8:
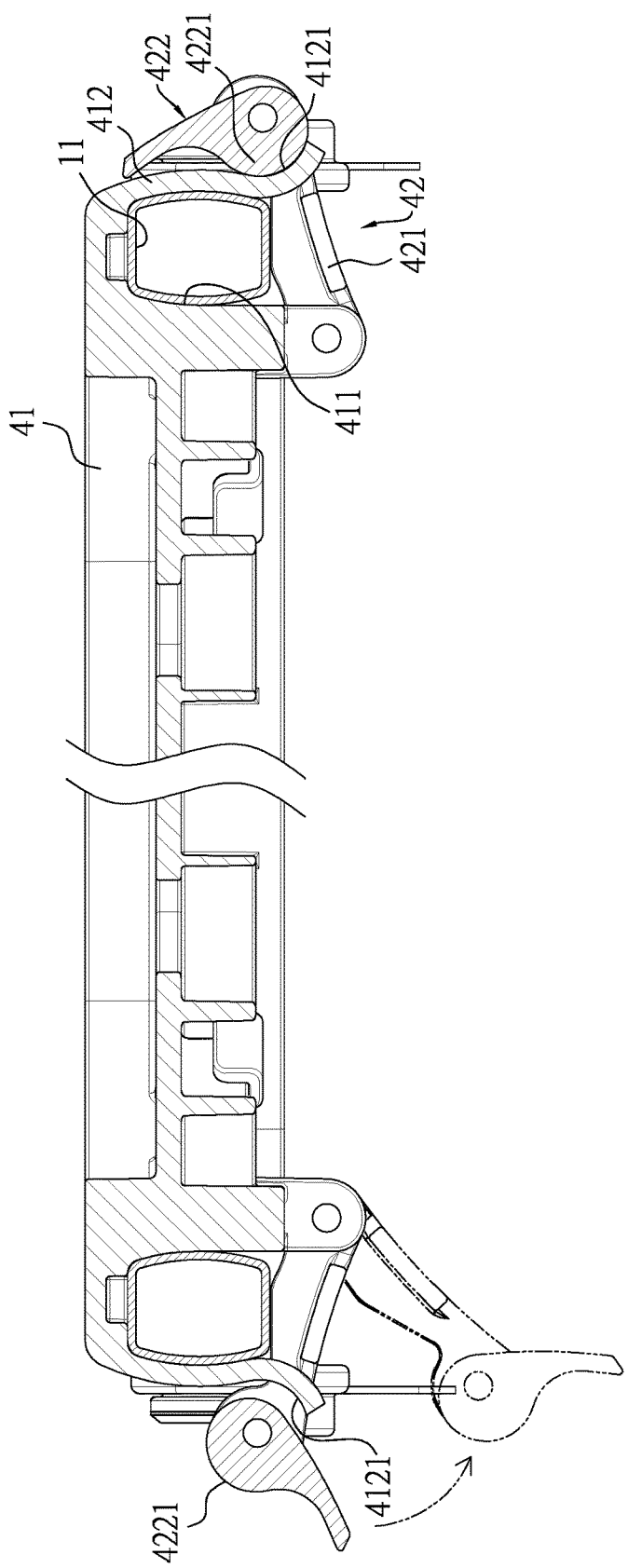
FIG. 8 is a front view in partial section of a rear-seat panel and the rear-seat fixing assembly of the baby carriage in FIG. 1.

With reference to FIGS. 7 and 8, the seat clamping panel 422 is pivotally connected to the other side of the seat pivot frame 421, and the seat clamping panel 422 is formed with a seat eccentric part 4221. A head of the seat clamping panel 422 is roughly round. A rotating shaft is eccentrically mounted through the head of the seat clamping panel 422. That is, a distance between a periphery of the head and the rotating shaft is not constant. When the seat clamping panel 422 is rotated to make the seat eccentric part 4221 abut against the transverse side of the rear-seat panel 41, the distance between the rotating shaft and the transverse side of the rear-seat panel 41 is the largest to make the seat eccentric part 4221 tightly abut the transverse side of the rear-seat panel 41, such that the rear-seat panel 41 is fixed on the frame body 10.

The relative rotation between the seat eccentric part 4221 and the seat pivot frame 421 makes the seat eccentric part 4221 tightly abut the rear-seat panel 41 to fix the rear-seat panel 41 on the frame body 10, which is convenient and quick in use, is reliable, and is easy to separate the rear-seat panel 41 from the frame body 10. The clamping recesses 411 on the bottom of the rear-seat panel 41 enable the rear-seat panel 41 to move continuously front-and-rear along the frame body 10 in one step. When the rear-seat panel 41 is moved to any suitable position, the rear-seat panel 41 can be quickly and stably fixed on the frame body 10.

Two rear-seat resilient panels 412 are respectively mounted on the two transverse sides of the rear-seat panel 41, and each rear-seat resilient panel 412 has a curved concave surface 4121 on an outer wall of the rear-seat resilient panel 412.

To be specific, when the seat pivot frame 421 is rotated to be below the clamping recess 411, the seat clamping panel 422 can be rotated upward to make the seat eccentric part 4221 tightly abut the curved concave surface 4121 of the rear-seat resilient panel 412 of the rear-seat panel 41, such that two side walls of the clamping recess 411 tightly clamp the seat rod 11 to fix a relative position between the rear-seat panel 41 and the frame body 10. On the contrary, to detach the rear-seat panel 41, the seat clamping panel 422 is rotated reversely to make the seat eccentric part 4221 not abut the rear-seat resilient panel 412, and then the rear-seat panel 41 is detached upward from the seat rods 11.

Figure 9:
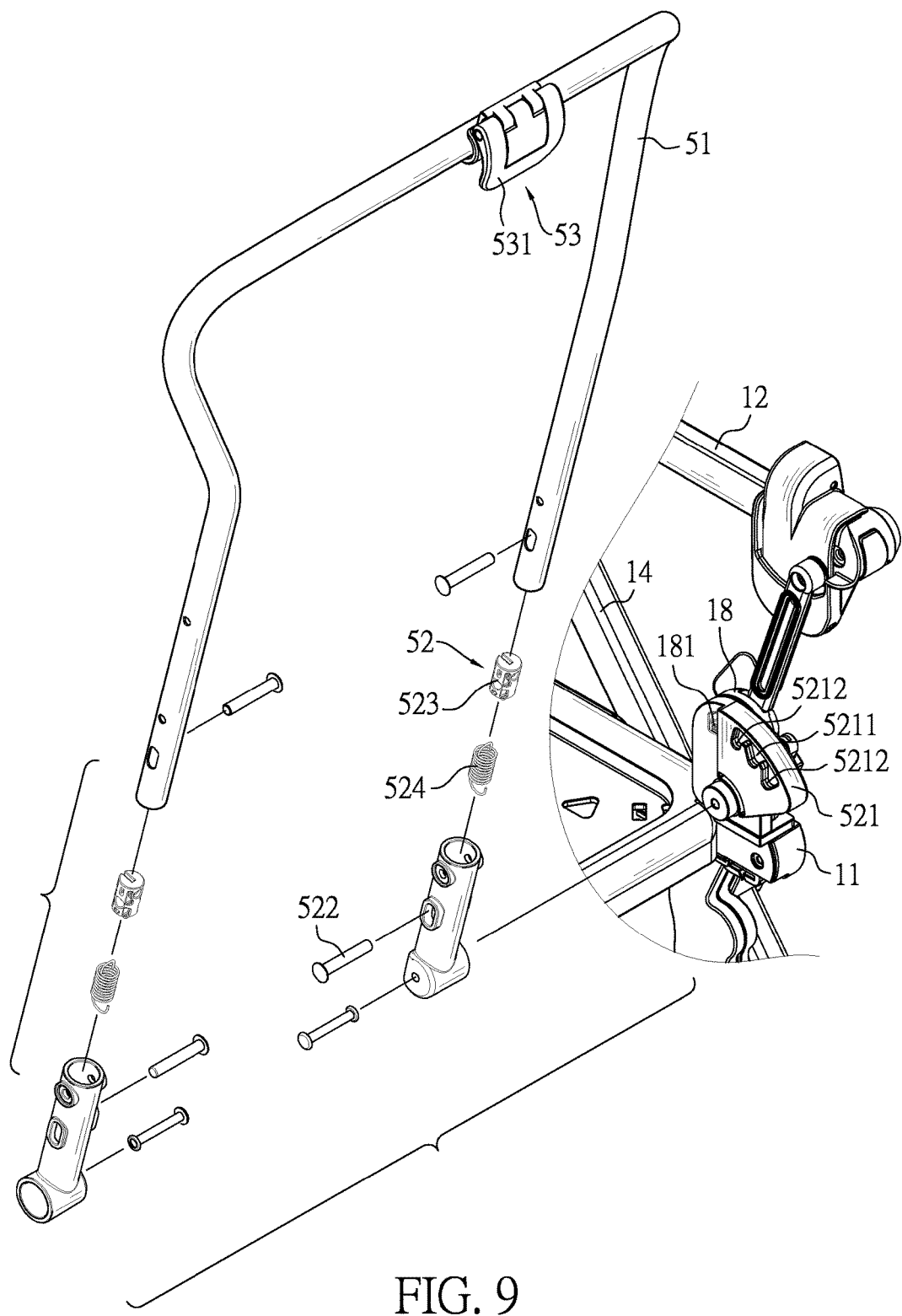
FIG. 9 is an exploded perspective view of a rear back-support fixing assembly of the baby carriage in FIG. 1.

With reference to FIGS. 2 and 9, the rear back-support rod 51 is tiltably and detachably mounted on the two seat rods 11 of the frame body 10. The two rear back-support fixing assemblies 52 are respectively mounted between the rear back-support rod 51 and the two seat rods 11 to fix the rear back-support rod 51 on the two seat rods 11.

Each rear back-support fixing assembly 52 has a channel unit 521, a positioning pin 522, a moving element 523, and a positioning pin resilient element 524. The two channel units 521 of the two rear back-support fixing assemblies 52 are respectively mounted securely on the two seat rods 11. A channel recess 5211 and multiple positioning parts 5212 are formed in a side surface of the channel unit 521. The positioning parts 5212 are spaced apart from each other, are disposed below the channel recess 5211, and communicate with the channel recess 5211. The rear back-support rod 51 is pivotally connected to a side surface that forms the channel recess 5211 of the channel unit 521. The positioning pin 522 is up-and-down movably mounted through the rear back-support rod 51, and is up-and-down movably mounted in the channel recess 5211. To be specific, the positioning pin 522 is movable in the channel recess 5211, and may be moved into one of the positioning parts 5212. The positioning pin resilient elements 524 are mounted in the rear back-support rod 51, and downwardly push the positioning pins 522 to make the positioning pins 522 move into the positioning part 5212.

To be specific, the positioning pin resilient element 524 may be a spring. An end of the spring is connected to the moving element 523, and the other end of the spring is connected to a shaft between the rear back-support rod 51 and the seat rod 11. The rear back-support rod 51 is formed with an elongated hole, and the moving element 523 corresponds in position to the elongated hole. Thus, the positioning pin 522 is up-and-down moveable in the elongated hole, and the positioning pin 522 is limited in the corresponding positioning part 5212 by the positioning pin resilient element 524.

The rear back-support switch assembly 53 is for controlling the two rear back-support fixing assemblies 52. The rear back-support switch assembly 53 is mounted on the rear back-support rod 51 and has a rear back-support switch 531 and a rear back-support rod rope (not shown). Two ends of the rear back-support rod rope are respectively connected to the rear back-support switch 531 and the positioning pin 522 of one of the rear back-support fixing assemblies 52. In a preferred embodiment, the rear back-support rod rope is preferably, but not limited to, a steel rope. The rear back-support switch 531 can pull up the two positioning pins 522 via the two rear back-support rod ropes.

Normally, the positioning pin 522 engages in one of the positioning parts 5212, thereby fixing the relative angle between the rear back-support rod 51 and the seat rods 11. To adjust the angle, the rear back-support switch 531 is pressed to make the positioning pin 522 detached upward from the positioning part 5212.

With reference to FIG. 9, in addition, each seat rod 11 is mounted with a connecting seat 18, and the connecting seat 18 has a pressing protrusion 181. The channel unit 521 of the rear back-support fixing assembly 52 is downwardly mounted around the connecting seat 18, and the channel unit 521 has an opening for the pressing protrusion 181 to protrude out. Therefore, normally, the pressing protrusion 181 engages in the opening of the channel unit 521, and thus the rear back-support rod 51 and rear back-support fixing assembly 52 are fixed on the seat rods 11. To separate the rear back-support rod 51, the pressing protrusion 181 of the connecting seat 18 is pressed to be inside of the opening, and the rear back-support rod 51 and the rear back-support fixing assembly 52 are upward detachable from the seat rods 11 and the connecting seats 18.

In a preferred embodiment, the front back-support rod 31 is tiltably and detachably mounted on the two seat rods 11 of the frame body 10. The two front back-support fixing assemblies 32 and the front back-support switch assembly 33 are substantially the same in structure as the two rear back-support fixing assemblies 52 and the rear back-support switch assembly 53, and thus are not repeated in the description.

Figure 10:
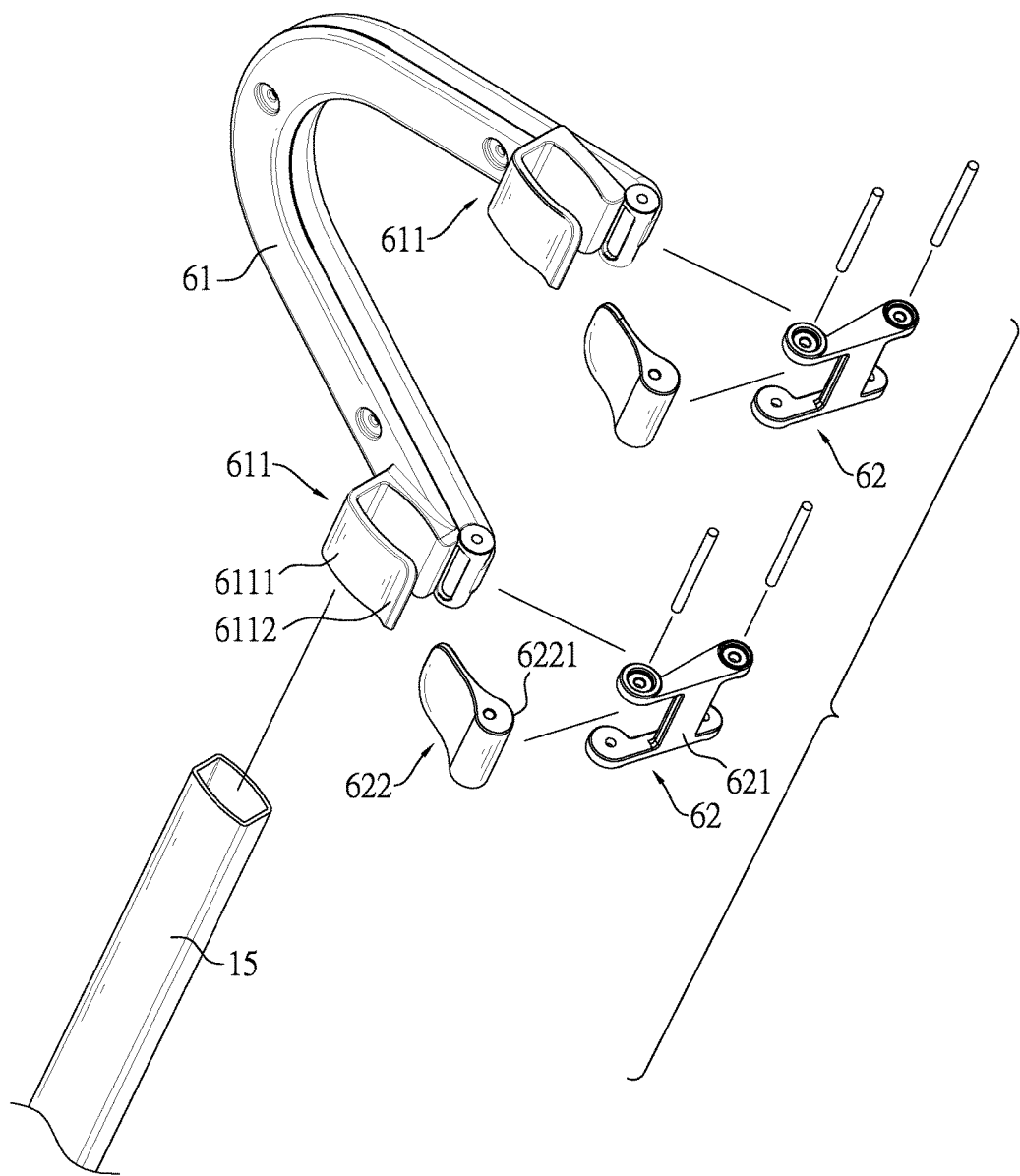
FIG. 10 is an exploded perspective view of an armrest fixing assembly of the baby carriage in FIG. 1.
Figure 11:
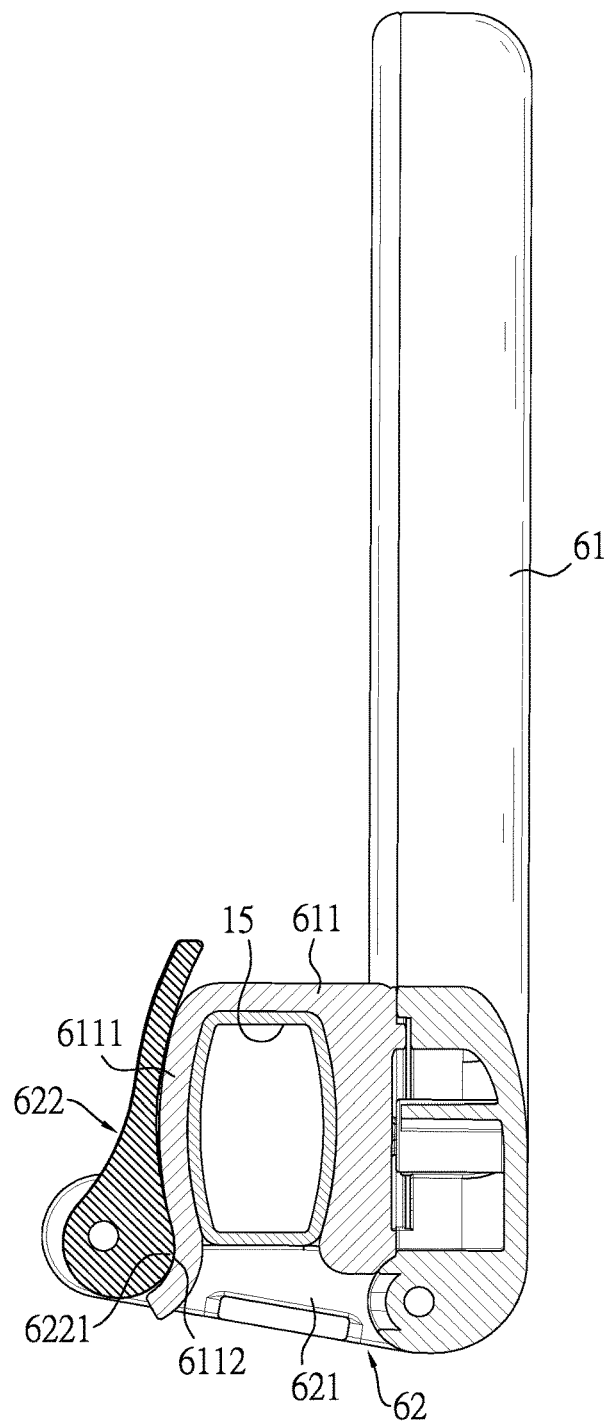
FIG. 11 is a front view in partial section of an armrest and the armrest fixing assembly of the baby carriage in FIG. 1.

With reference to FIGS. 2, 10, and 11, the two armrests 61 are up-and-down movably and detachably mounted on the pushing rod 15. In a preferred embodiment, the armrest 61 is U-shaped, and two ends of each armrest 61 are respectively mounted with a surrounding element 611. The surrounding element 611 is mounted around the pushing rod 15 by a backward opening. In a preferred embodiment, a transverse outer side of the surrounding element 611 is mounted with a surrounding element resilient panel 6111. An outer wall of the surrounding element resilient panel 6111 is formed with a curved concave surface 6112.

The two armrest fixing assemblies 62 are respectively mounted on the two armrests 61, are connected to the pushing rod 15, and respectively fix the two armrests 61 on the pushing rod 15. In a preferred embodiment, each armrest fixing assembly 62 corresponds to the two surrounding elements 611 on the same armrest 61. The armrest fixing assembly 62 has an armrest pivot frame 621 and an armrest clamping panel 622. One of two sides of each armrest pivot frame 621 is pivotally connected to the corresponding end of the armrest 61, and the armrest pivot frame 621 is rotatable to surround the pushing rod 15 with the corresponding surrounding element 611.

With reference to FIGS. 10, and 11, the armrest clamping panel 622 is pivotally connected to the other side of the armrest pivot frame 621, and the armrest clamping panel 622 is formed with an armrest eccentric part 6221. A head of the armrest clamping panel 622 is roughly round. A rotating shaft is eccentrically mounted through the head of the armrest clamping panel 622. That is, a distance between a periphery of the head and the rotating shaft is not constant. When the armrest clamping panel 622 is rotated to make the armrest eccentric part 6221 abut against the transverse side of the surrounding element resilient panel 6111, the distance between the rotating shaft and the transverse side of the surrounding element resilient panel 6111 is the largest to make the armrest eccentric part 6221 tightly abut the transverse side of the surrounding element resilient panel 6111, such that the armrest 61 is fixed on the frame body 10.

To be specific, when the armrest pivot frame 621 is rotated to be in back of the surrounding element 611, the armrest clamping panel 622 can be rotated forward to make the armrest eccentric part 6221 tightly abut the curved concave surface 6112 of the surrounding element resilient panel 6111 of the surrounding element 611, such that the two side walls of the surrounding element 611 tightly clamp the pushing rod 15 to fix a relative position between the armrest 61 and the pushing rod 15. On the contrary, to detach the armrest 61, the armrest clamping panel 622 is rotated reversely to make the armrest clamping panel 622 not abut the surrounding element resilient panel 6111, and then the armrest 61 can be detached forward from the pushing rod 15.

Figure 14:
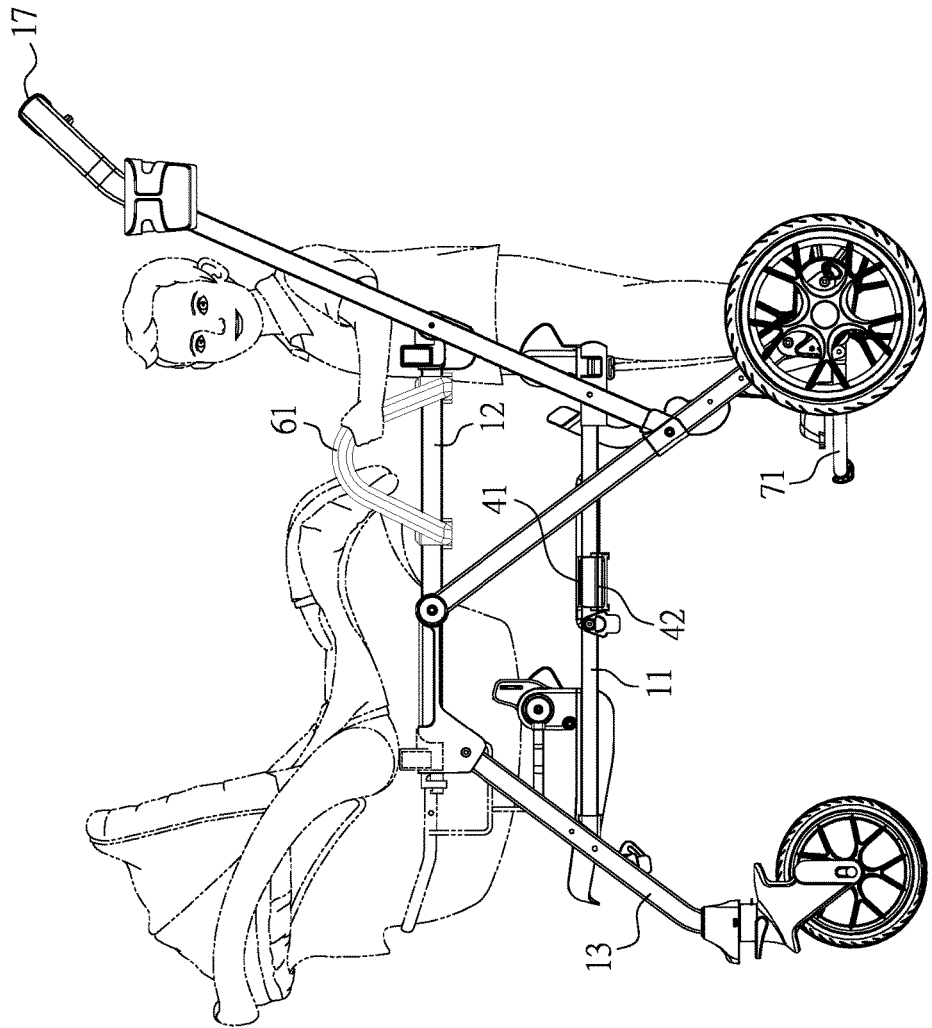

With reference to FIG. 14, in addition, in a preferred embodiment, the pushing rod 15 is same with the armrest rod 12 in cross section. Thus, the armrest 61 and the armrest fixing assembly 62 may be mounted on the armrest rod 12, thereby facilitating convenience in use and increasing various ways of use.

When the present invention is in use, the rear-seat panel 41 is front-and-rear moveable to adjust the space between the front-seat panel 21 and the rear-seat panel 41, thereby fitting babies and children of different body sizes and ages.

Figure 12:
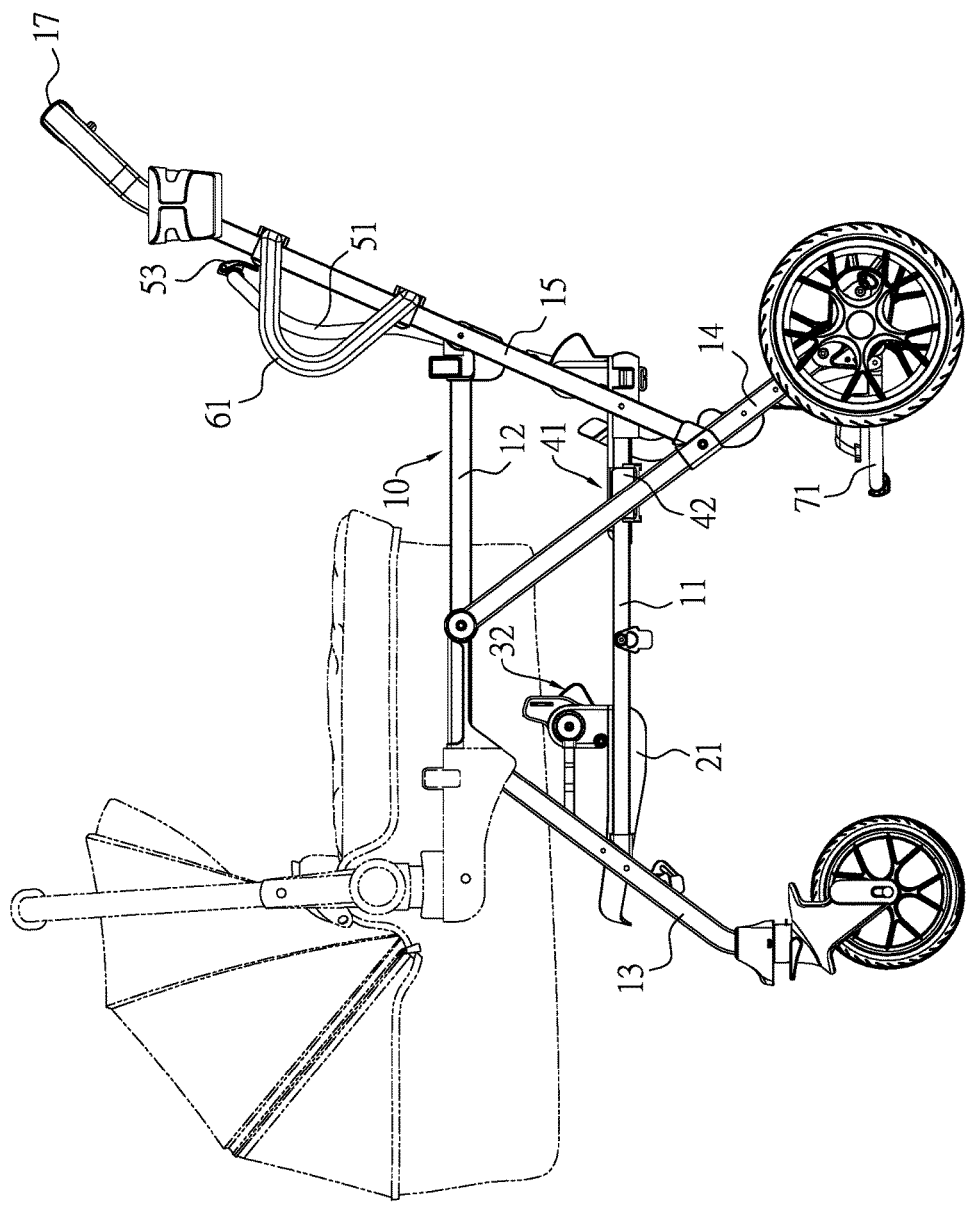
FIG. 12 is a side view of the baby carriage in FIG. 1, showing the rear-seat panel moved backward and a front back-support rod detached.

With reference to FIG. 12, when the rear-seat panel 41 is moved backward relative to the two seat rods 11 and the front back-support rod 31 is detached, the space corresponding to the front-seat panel 21 can accommodate objects such as a baby car basket or a child car safety seat. At the same time, the space corresponding to the rear-seat panel 41 is still large enough for the baby or the child to be seated therein.

On the contrary, when the rear back-support rod 51 is detached, the space corresponding to the rear-seat panel 41 also can accommodate the baby car basket or the child car safety seat. At this time, the space corresponding to the front-seat panel 21 is still large enough for the baby or the child to be seated therein.

With reference to FIGS. 13, and 14, when the rear-seat panel 41 is moved forward relative to the two seat rods 11 and the rear back-support rod 51 is detached, an elder or bigger child can stand on the stand board 71 and hold the armrests 61. The armrest 61 can be moved upward or downward on the pushing rod 15 or can be moved front-and-rear on the armrest rods 12 to be grabbed conveniently.

Figure 15:
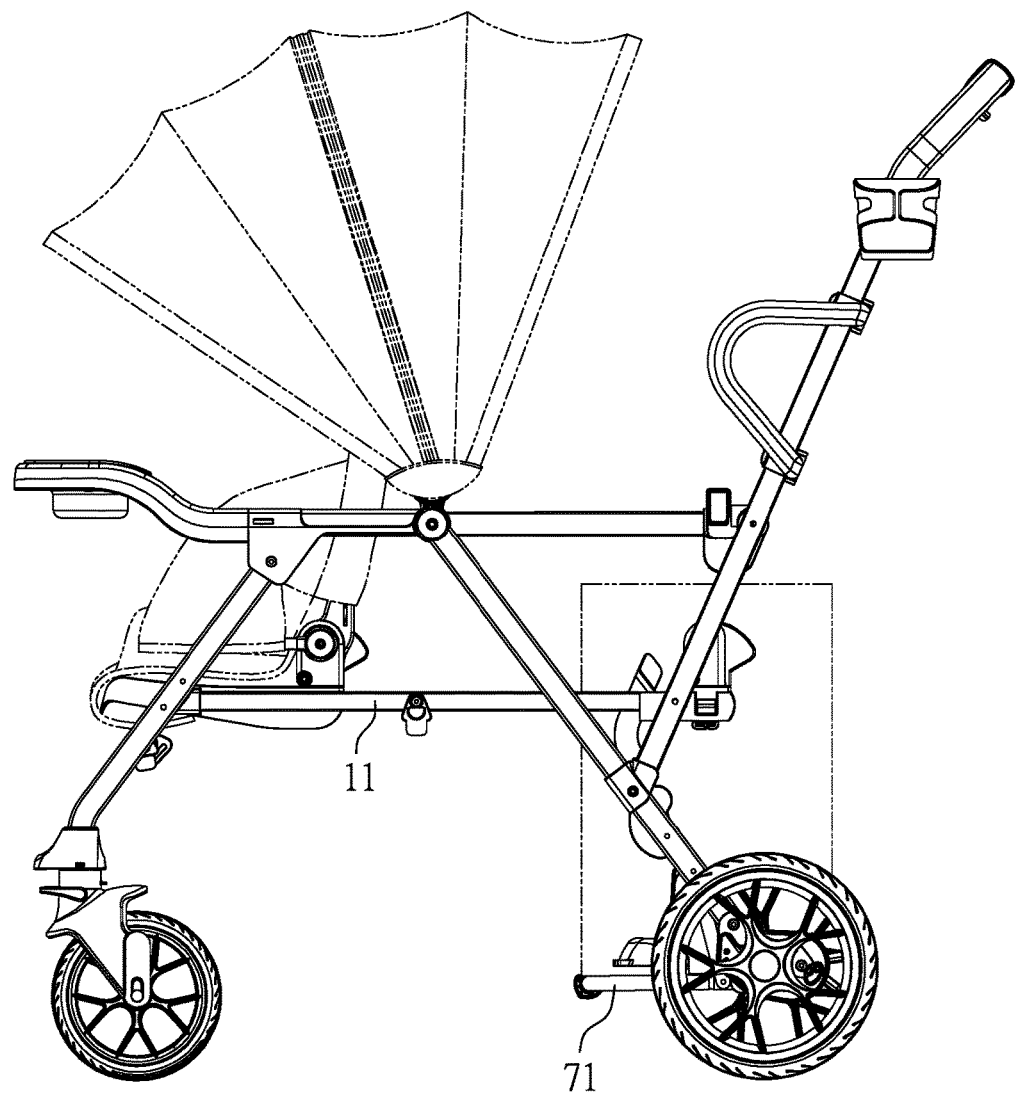
FIGS. 15 and 16 are side views of the baby carriage in FIG. 1, showing the rear-seat panel and the rear back-support rod detached.
Figure 16:
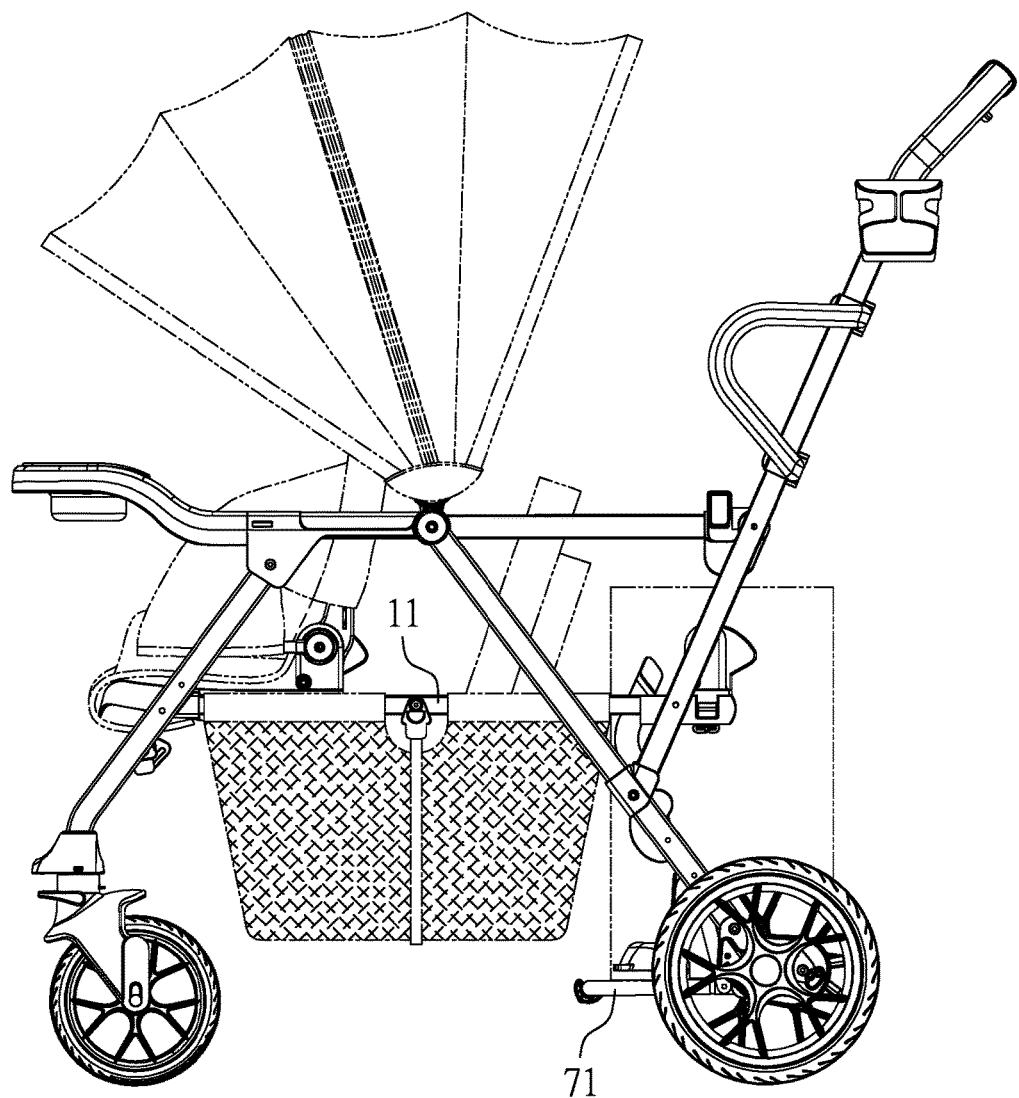

With reference to FIGS. 15, and 16, finally, the rear-seat panel 41a also can be detached when in need for a larger space. For example as shown in FIG. 15, a hanging connector 111 is mounted on a bottom of the seat rod 11 to hang a large shopping bag with a top opening or the shopping basket below the seat rod 11.

To be specific, a belt crosses a bottom of the shopping basket and two ends of the belt respectively extend above two sides of the shopping basket. The two ends of the belt are respectively mounted with a connecting part. The connecting part is 8-shaped and has an upper and smaller first circle and a lower and larger second circle. The hanging connector 111 comprises a tube and a protrusion. The protrusion is formed on an outer end of the tube, and the protrusion is larger than the tube in diameter. The first circle of the connecting part is substantially the same as the tube of the hanging connector 111 in diameter. The second circle is substantially the same as the protrusion in diameter. When installed, the connecting part of the belt engages with the hanging connector 111. The second circle is mounted through the protrusion and the tube in sequence, and then the hanging connector falls down by the gravity to make the first circle mounted around the tube. At this time, the protrusion abuts the first circle to prevent the connecting part from detaching from the hanging connector.

In addition, in the abovementioned figures, the baby car basket and the child safety seat are mounted on the space corresponding to the front-seat panel 21. But the baby car basket and the child safety seat also may be mounted on the space corresponding to the rear-seat panel 41. Therefore, the baby or the child also can sit on the front-seat panel 21. Moreover, when the baby or the child sits on the rear-seat panel 41, he can face forward (with the rear back-support rod 51 installed) or face backward (with the rear back-support rod 51 uninstalled). When the child faces backward, his can put his feet on the stand board 71.

Figure 18:
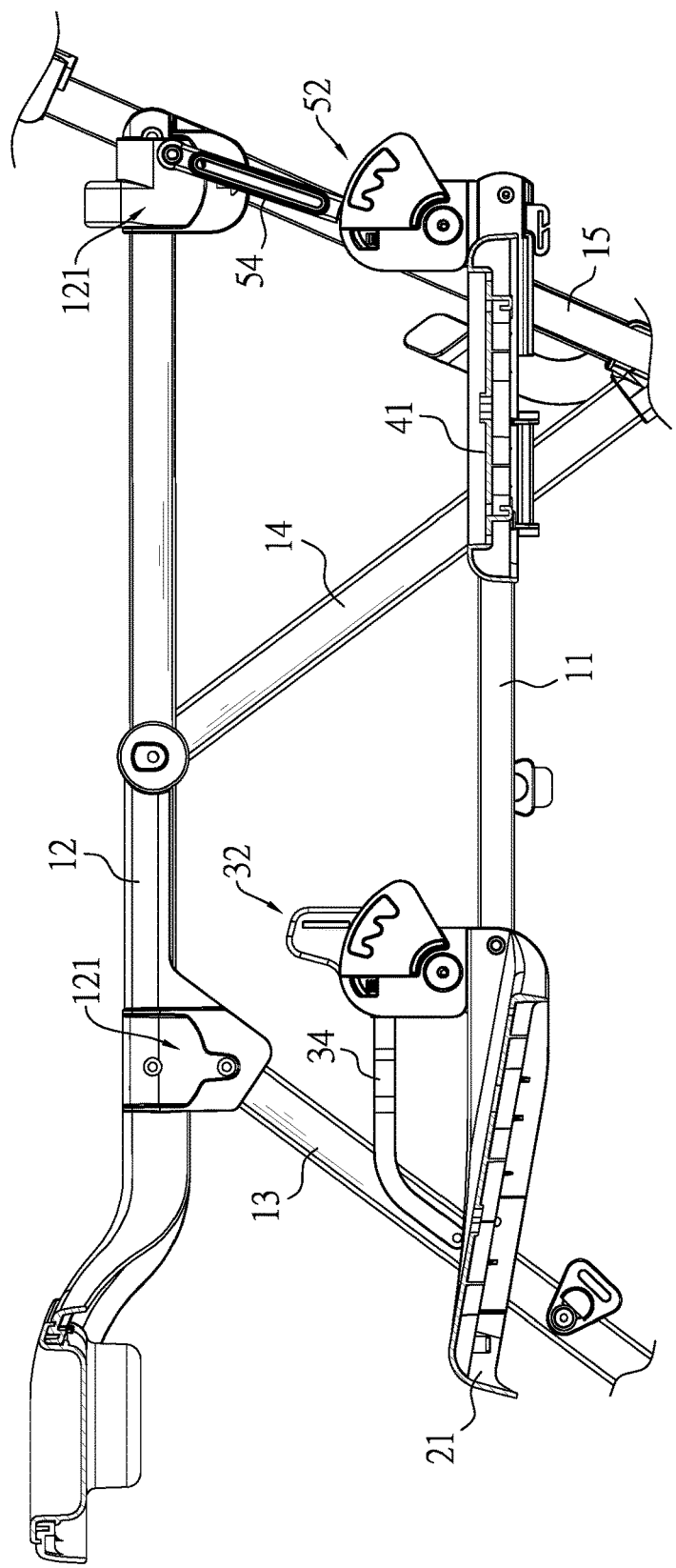
FIG. 18 is a side view of the baby carriage in FIG. 1, showing a mounting recess assembly, a front back-support linking element, and a rear back-support linking element.

With reference to FIGS. 1 and 18, each armrest rod 12 is mounted with two mounting recess assemblies 121. The two mounting recess assemblies 121 respectively correspond in position to the front-seat panel 21 and the rear-seat panel 41, and both for connecting the baby car basket or the child safety seat. In a preferred embodiment, each mounting recess assembly 121 has a recess with an opening. The opening is same in shape with connectors of the baby car basket or the child safety seat. To install the baby car basket or the child safety seat on the armrest rods 12, just mount the connector in the mounting recess assembly 121 via the opening, thereby facilitating convenience in installation.

Besides, in a preferred embodiment, a front back-support linking element 34 is mounted between the front foot rod 13 and the front back-support rod 31. The front back-support linking element 34 is an L-shaped rod, and two ends of said front back-support linking element are respectively pivotally connected to the front foot rod 13 and the front back-support fixing assembly 32. When the frame body 10 is folded, the two front foot rods 13 respectively move the front back-support rod 31 to be folded via the two front back-support linking elements 34.

In a preferred embodiment, a rear back-support linking element 54 is mounted between the armrest rod 12 and the rear back-support rod 51. The rear back-support linking element 54 is a retractable rod, and two ends of the rear back-support linking element 54 are respectively pivotally connected to the mounting recess assembly 121 of the armrest rod 12 and the rear back-support fixing assembly 52. When the frame body 10 is folded, the two armrest rods 12 respectively move the rear back-support rod 51 to be folded via the two rear back-support linking elements 54.

The mounting recess assembly 121 is mounted on the armrest rod 12. The mounting recess assembly 121 not only can be inserted with the connector of the baby car basket or the connector of the child safety seat, but also can be inserted with an engager of the rear back-support linking element 54, thereby connecting the rear back-support linking element 54 and the mounting recess assembly 121.

The folding of the front back-support rod 31 relative to the two front foot rods 13 and the folding of the rear back-support rod 51 relative to the two armrest rods 12 are achieved by preferably, but not limited to, structures different from the channel recess 5211 and the positioning pin 522. The rear-seat panel 41 is front-and-rear movable and can be fixed on any portion of the seat rod 11, and the front back-support rod 31 and the rear back-support rod 51 are detachable from the frame body 10, so that the present invention can be adapted to various situations and has various ways of use.

In another preferred embodiment, the frame body may be altered in other structures, for example, being folded by different structures. Or even the frame body may be non-foldable, which does not affect the aforementioned advantages that has various ways of use In another preferred embodiment, an amount of the rear-seat fixing assembly may be one, and an amount of the clamping recess on the bottom of the rear-seat panel is also one. The clamping and the fixing in single side also can fix the rear-seat panel on any portion of the seat rods.

In another preferred embodiment, a middle-seat panel, two middle-seat panel fixing assemblies, a middle back-support rod, two middle back-support rod fixing assemblies, and a middle back-support rod switch assembly may be added. The middle-seat panel is front-and-rear moveably and detachably mounted on the frame body. The middle-seat panel is disposed between the front-seat panel and the rear-seat panel. The two middle-seat panel fixing assemblies are respectively mounted on two sides of the middle-seat panel, are connected to the frame body, and can fix the middle-seat panel on the frame body. The middle back-support rod is tiltably and detachably mounted on the frame body. The two middle back-support rod fixing assemblies are mounted between the middle back-support rod and the frame body, and can fix the middle back-support rod on the frame body.

The two middle-seat panel fixing assemblies, the two middle back-support rod fixing assemblies, and the middle back-support rod switch assembly are the same in structure as the two rear back-support fixing assemblies, the two rear back-support fixing assemblies and the rear back-support switch assembly, and thus are not repeated in the description.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A baby carriage frame comprising:
a frame body;
multiple wheels mounted on the frame body;
a front-seat panel mounted on the frame body;
a rear-seat panel front-and-rear moveably mounted on the frame body, disposed in back of the front-seat panel, and having:
  two clamping recesses formed in a bottom of the rear-seat panel, disposed adjacent to each one of two transverse sides of the rear-seat panel, and downwardly disposed around the frame body; and
two rear-seat fixing assemblies, each one of the rear-seat fixing assemblies mating with a respective clamping recess, each one of the two rear-seat fixing assemblies having:
  a seat pivot frame, one of two sides of the seat pivot frames is pivotally connected to the bottom of the rear-seat panel, and disposed adjacent to the respective clamping recess, wherein the seat pivot frame is rotatable to be disposed below the respective clamping recess; and
  a seat clamping panel pivotally connected to the other side of the seat pivot frame, and having a seat eccentric part selectively abutting tightly against the transverse side of the rear-seat panel that the clamping recess is disposed adjacent to, so as to fix the rear-seat panel on the frame body; and wherein the rear-seat panel further has:
a rear-seat resilient panel formed on an outer wall of each clamping recess, connecting the rear-seat panel to each rear-seat fixing assembly, and formed on each one of the two transverse sides of the rear-seat panel; each one of the two rear-seat resilient panels having a curved concave surface formed on the outer wall of the rear-seat resilient panel, and abutted tightly by the seat eccentric part of the respective rear-seat fixing assembly.

2. The baby carriage frame as claimed in claim 1, wherein the frame body further has
two seat rods transversely spaced apart from each other;
two armrest rods transversely spaced apart from each other, and respectively disposed above the two seat rods;
two front foot rods respectively connected to the two seat rods, and respectively connected to the two armrest rods;
two rear foot rods respectively connected to the two armrest rods; and
a pushing rod being U-shaped with a downward opening, connected between two rear ends of the seat rod, and connected between two rear ends of the armrest rod; two bottom ends of the pushing rod respectively connected to the two rear foot rods.

3. The baby carriage frame as claimed in claim 2, wherein the two front foot rods are respectively pivotally connected to the two seat rods, and two top ends of the two front foot rods are respectively pivotally connected to the two armrest rods;
the pushing rod is pivotally connected to the two seat rods, and the pushing rod is pivotally connected to the two armrest rods; and
two top ends of the two rear foot rods are respectively pivotally connected to the two armrest rods.

4. The baby carriage frame as claimed in claim 3, wherein each one of the two rear foot rods is formed with a receiving recess; and
the baby carriage frame further has
a folding switch assembly mounted on the pushing rod and having
two fixing units up-and-down movably mounted in the pushing rod, and selectively downwardly mounted in the two receiving recesses of the two rear foot rods respectively;
two fixing unit resilient elements mounted in the pushing rod, and respectively pushing the two fixing units into the corresponding receiving recess;
a folding switch; and
two folding ropes respectively corresponding to the two fixing units; each one of the two folding ropes connected between the folding switch and the corresponding fixing unit; wherein the folding switch being capable of pulling up the two fixing units via the two folding ropes.

5. The baby carriage frame as claimed in claim 1 further comprising:
a rear back-support rod tiltably and detachably mounted on the frame body; and
two rear back-support fixing assemblies mounted between the rear back-support rod and the frame body, and being capable of fixing the rear back-support rod on the frame body.

6. The baby carriage frame as claimed in claim 2 further comprising:
a rear back-support rod tiltably and detachably mounted on the two seat rods;
two rear back-support fixing assemblies respectively mounted between the rear back-support rod and the two seat rods, and being capable of fixing the rear back-support rod on the two seat rods; and
two rear back-support linking elements respectively mounted between the rear back-support rod and the two armrest rods; each one of the two rear back-support linking elements being a retractable rod, and two ends of said rear back-support linking element respectively pivotally connected to the corresponding armrest rod and one of the two rear back-support fixing assemblies;
wherein when the frame body is folded, the two armrest rods moving the rear back-support rod to be folded via the two rear back-support linking elements.

7. The baby carriage frame as claimed in claim 2 further comprising:
a rear back-support rod tiltably and detachably mounted on the two seat rods; and
two rear back-support fixing assemblies mounted between the rear back-support rod and the two seat rods, and being capable of fixing the rear back-support rod on the two seat rods; each one of the two rear back-support fixing assemblies having
a channel unit mounted securely on the corresponding seat rod, and having;
a channel recess formed in a side surface of the channel unit; and
multiple positioning parts formed in the side surface of the channel unit, spaced apart from each other, disposed below the channel recess, and communicating with the channel recess;
a positioning pin, wherein the rear back-support rod is pivotally connected to the side surface of the channel unit, and the positioning pin is up-and-down movably mounted through the rear back-support rod and up-and-down movably mounted in the channel recess; and
a positioning pin resilient element mounted in the rear back-support rod, and pushing down the positioning pin downwardly.

8. The baby carriage frame as claimed in claim 7 further comprising:
a rear back-support switch assembly mounted on the rear back-support rod, and having
a rear back-support switch; and
two rear back-support rod ropes respectively corresponding to the two rear back-support fixing assemblies; two ends of each one of the two rear back-support rod ropes respectively connected to the rear back-support switch and the positioning pin of the corresponding rear back-support fixing assembly; wherein the rear back-support switch is capable of pulling up the positioning pin via the rear back-support rod rope.

9. The baby carriage frame as claimed in claim 7, wherein each one of the two seat rods has
a connecting seat having
a pressing protrusion;
the channel unit of each one of the two rear back-support fixing assemblies is downwardly mounted around the connecting seat, and has
an opening for the pressing protrusion to protrude out;

wherein when the pressing protrusion is mounted in the opening of the channel unit, the pressing protrusion and the opening fix the rear back-support rod and the rear back-support fixing assembly on the connecting seat and the seat rod; and wherein when the pressing protrusion is pressed to be inside the opening of the channel unit, the rear back-support rod and the rear back-support fixing assembly are upward detachable from the connecting seat and the seat rod.

10. The baby carriage frame as claimed in claim 2 further comprising:

two armrests up-and-down movably and detachably mounted on the pushing rod or the two armrest rods respectively; and two armrest fixing assemblies respectively mounted on the two armrests, connected to the pushing rod or the two armrest rods respectively, and being capable of fixing the two armrests on the pushing rod or the two armrest rods respectively.

11. The baby carriage frame as claimed in claim 10, wherein each one of the two armrests is U-shaped, and has
two surrounding elements respectively mounted on two ends of said armrest, and each one of the two surrounding elements mounted around the pushing rod or the corresponding armrest rod; and each one of the two armrest fixing assemblies has
two armrest pivot frames respectively corresponding to the two ends of the corresponding armrest, and respectively corresponding to the two surrounding elements of said armrest; one of two sides of each one of the two armrest pivot frames pivotally connected to the corresponding end of the corresponding armrest; wherein each one of the two armrest pivot frames is rotatable to surround the pushing rod or the corresponding armrest rod with the corresponding surrounding element; and two armrest clamping panels respectively and pivotally connected to the other sides of the two armrest pivot frames, and respectively corresponding to the two surrounding elements of the corresponding armrest; each one of the two armrest clamping panels having an armrest eccentric part selectively abutting tightly against a transverse outer side of the corresponding surrounding element.

12. The baby carriage frame as claimed in claim 10, wherein the pushing rod has the same cross section as the armrest rod.

13. The baby carriage frame as claimed in claim 1 further comprising:

a stand board mounted on the frame body, and disposed between two of the wheels.

14. The baby carriage frame as claimed in claim 2 further comprising a stand board mounted on the two rear foot rods, and disposed between two of the wheels on the two rear foot rods; and two stand linking assemblies mounted on the stand board, respectively connected to the two seat rods, and respectively connected to the two rear foot rods; wherein when the frame body is folded or expanded, the stand linking assemblies rotate the stand board to be folded or expanded.

15. The baby carriage frame as claimed in claim 14, wherein each one of the two stand linking assemblies has a driving element; a top end of the driving element pivotally connected to the corresponding seat rod, and a bottom end of the driving element pivotally connected to the corresponding rear foot rod via a first pin; the driving element having
a curved guiding hole; and a linking rod; a bottom end of the linking rod pivotally connected to the stand board; the linking rod having
a linking slide hole formed through a top end of the linking rod for the first pin to mount through; and
a second pin mounted through the linking rod, and mounted in the curved guiding hole.

16. The baby carriage frame as claimed in claim 14, wherein a stand tube is pivotally connected to the stand board, and is rotatable to abut on the ground.

17. The baby carriage frame as claimed in claim 2, wherein each one of the two armrest rods has at least one mounting recess assembly corresponding in position to the front-seat panel or the rear-seat panel for connecting to a baby car basket or a child safety seat.

18. The baby carriage frame as claimed in claim 2, wherein each one of the two seat rods has a hanging connector mounted on a bottom of said seat rod for hanging a bag or a basket.

19. A baby carriage with a baby carriage frame as claimed in claim 1.

* * * * *